(12) United States Patent
Black (10) Patent No.: US 10,207,538 B2
(45) Date of Patent: Feb. 19, 2019

(54) DEVICE FOR SIMULTANEOUSLY REMOVING AND TIGHTENING A PLURALITY OF LUG NUTS

(71) Applicant: Jacob Black, Houston, TX (US)

(72) Inventor: Jacob Black, Houston, TX (US)

(*) Notice: Subject to any disclaimer, the term of this patent is extended or adjusted under 35 U.S.C. 154(b) by 205 days.

(21) Appl. No.: 15/409,411

(22) Filed: Jan. 18, 2017

(65) Prior Publication Data
US 2018/0201061 A1   Jul. 19, 2018

Related U.S. Application Data

(60) Provisional application No. 62/280,258, filed on Jan. 19, 2016.

(51) Int. Cl.
*B60B 29/00* (2006.01)
*B25B 23/18* (2006.01)
*B25B 27/00* (2006.01)

(52) U.S. Cl.
CPC ............ *B60B 29/006* (2013.01); *B25B 23/18* (2013.01); *B25B 27/0035* (2013.01); *B60B 2900/351* (2013.01); *B60B 2900/541* (2013.01); *B60B 2900/571* (2013.01)

(58) Field of Classification Search
CPC ... B25B 23/18; B25B 27/0035; B60B 29/006; B60B 2900/351; B60B 2900/541; B60B 2900/371
See application file for complete search history.

(56) References Cited

U.S. PATENT DOCUMENTS

| | | | | |
|---|---|---|---|---|
| 3,491,427 A * | 1/1970 | Zimmerman | ........... | B60B 29/00 29/240 |
| 5,277,085 A * | 1/1994 | Tanimura | .............. | B23P 19/069 81/57.14 |
| 6,305,245 B1 * | 10/2001 | Kress | .................... | B23P 19/069 81/57.14 |
| 7,836,796 B2 * | 11/2010 | Chang | .................... | B25B 17/00 81/57.22 |
| 8,904,615 B2 * | 12/2014 | Ohno | ...................... | B23P 19/06 227/109 |

* cited by examiner

*Primary Examiner* — Carl Arbes
(74) *Attorney, Agent, or Firm* — Darcell Walker (57) ABSTRACT

The present invention provides an improved device for simultaneously replacing a plurality of lug nuts through the use of computer technology, modularity, energy-efficiency, safety features and ease of use. Computer technology monitors and controls the torque on each lug nut. This invention also displays the loosening or tightening status of each lug nut on a small LCD screen. The present invention achieves modularity through a series of interchangeable gear train assemblies, contained in separate unitary housings, which correspond to respective vehicular wheel depth and wheel lug patterns. Also, magnetic concentric sockets are used to capture and hold lug nuts as they are removed from the vehicle's wheel and to remove and replace theft protection devices such as rim or wheel locks. This invention provides ease of use with user-friendly controls and a light-weight unitary housing that eliminates the need of assistance from another person.

18 Claims, 14 Drawing Sheets

| # of studs | Stud size | # of threads | Maximum torque |
|---|---|---|---|
| 4 | 1.0 cm | 4 | 4 joules |
| 5 | 1.0 cm | 4 | 4 joules |
| 6 | 1.5 cm | 5 | 6 joules |
| 7 | 1.7 cm | 6 | 7 joules |
| 8 | 2.0 cm | 6 | 8 joules |

DEVICE FOR SIMULTANEOUSLY REMOVING AND TIGHTENING A PLURALITY OF LUG NUTS

CROSS-REFERENCE TO RELATED APPLICATION

This provisional patent application is related to provisional patent application No. 62/280,258. The contents of both applications are incorporated herein by reference.

FIELD OF THE INVENTION

The present invention relates generally to lug nut removal devices. More specifically, the present invention pertains to a new lug nut removal device for simultaneously removing and tightening a plurality of lug nuts of various vehicular wheel lug patterns.

BACKGROUND

Lug nuts are an essential part of a motor vehicle for securing the wheel to the vehicle. A set of lug nuts (i.e. 4 to 5) are used on each wheel of the vehicle. One uses tools such as socket wrenches, lug wrenches or impact wrenches to remove or replace lug nuts.

Traditionally, when removing or replacing lug nuts, each lug nut is individually removed and installed. In an attempt to make this lug nut removal process more efficient, there are designs for tools that simultaneously remove and/or install a set of lug nuts. Several designs exist for lug nut removal devices. Many of these designs are captured in various U.S. patents. U.S. Pat. No. 6,134,989 describes a multi-lug nut removal device which aids a person in the simultaneous removal of lug nuts from a wheel. Another type of lug nut removal device, U.S. Pat. No. 5,647,254 presents a multi-fastener device that may be used to simultaneously drive multiple fasteners for tightening and loosening. U.S. Pat. No. 6,668,685 describes a device that allows the removal of lugs using a gear system that includes an outer ring gear surrounding a central gear and lug gears. U.S. Pat. No. 5,074,170 posits a device with a central gear mounted within a central housing hub with the central gear extending coaxially of and exteriorly of the top surface of the central housing to receive a drive tool of mechanical type, pneumatic or hydraulic activated. U.S. Pat. No. 4,063,475 further describes a multi-lug removal device that is powered by a separate power source such as a power tool. U.S. Pat. No. 6,305,245 describes a multilug nut removal tool wherein said drive surface comprises a recess bar engagement by an extender secured to a pneumatic wrench.

U.S. Pat. No. 6,305,245 to Kress describes a housing has five sockets extending beyond the front face thereof, spaced to simultaneously engage the lug nuts securing a wheel to a vehicle. Each socket has secured to a peripheral portion a satellite gear that engages a universal gear. The universal gear has a drive surface allowing it to be driven in a conventionally opposite direction to simultaneously remove the lug nuts and then driven in the opposite rotational direction by a pneumatic wrench to simultaneously secure the lug nuts securing the replacement wheel to the vehicle, greatly reducing the time needed for a wheel/tire change. This tool has the potential for greatly reducing the time required for a pit stop in stock car racing giving a huge advantage to the team so equipped.

U.S. Pat. No. 7,077,031 to Frederiksen describes a multiple lug nut removal tool includes an air gun that includes a cylindrical housing having a front end. A cover is mounted over the front end. A drive axle is mounted within the housing. A primary gear is attached to the drive axle. A plurality of secondary axles extends through the cover. Each of the secondary axles has a first end positioned within the housing and a second end extending outwardly away from the cover. Each of a plurality of secondary gears is attached to one of the first ends. The secondary gears are each in communication with the primary gear. Each of a plurality of couplers is attached to one of the secondary axles. Each of a plurality of sockets may be attached to one of the secondary axles by the couplers so that the sockets are rotated when the primary gear is rotated.

As mentioned, several designs for lug nuts tools currently exist. Although these devices fulfill their stated objectives and requirements, the need remains for a new and improved lug nut removal tool which leverages the features represented in the past designs while overcoming their limitations.

SUMMARY

The present invention overcomes the limitations of the prior lug nut tool designs with the use of computer technology, modularity, energy-efficiency, safety features and ease of use. Computer technology monitors and controls the torque on each lug nut. This technology also displays the loosening or tightening status of each lug nut on a small LCD screen. The present invention achieves modularity through a series of interchangeable gear train assemblies, contained in separate unitary housings, which correspond to respective vehicular wheel depth and wheel lug patterns. Also, magnetic concentric sockets are used to capture and hold lug nuts as they are removed from the vehicle's wheel and to remove and replace theft protection devices such as rim or wheel locks. Energy efficiency is accomplished through the use of a lightweight energy-efficient motor provided in a unitary housing and powered by various power sources; such as 110/120 volt wall outlets, a rechargeable battery-pack, cigarette lighter, or a special battery adapter. This invention provides ease of use with user-friendly controls and a light-weight unitary housing that eliminates the need of assistance from another person. Reflectors and LED lights can also be built into the unitary housing illuminate the work surface area to provide visibility to oncoming traffic and the user.

DETAILED DESCRIPTION OF THE INVENTION

All illustrations of the drawings are for the purpose of describing selected versions of the present invention and are not intended to limit the scope of the present invention. The present invention is a user-friendly, energy-efficient, light-weight, hand-held device that simultaneously removes and tightens the lug nuts on a vehicle's wheel. The present invention reduces safety hazards by illuminating the work surface and decreasing the amount of time and physical exertion necessary to mount or remove the wheel. The present invention has a motor that provides rotational force to the sun gear of a gear train assembly that includes planet gears, secondary axles, slip clutches and magnetic concentric sockets. Planet gears positioned around the circumference of the sun gear are meshed via the teeth of each gear thereby distributing the rotational force to the secondary axle of each planet gear in the gear train assembly. When the gear train assembly is active, the corresponding bearing and slip clutch of each secondary axle is engaged to ensure that adequate torque force is supplied to tighten or loosen the corresponding lug nut.

The present invention is generally comprised of an electric motor contained in a unitary housing with a primary drive axle extending from the front-end of the unitary housing and a gear train assembly comprised of a sun gear and planet gears with corresponding secondary axles, slip clutches, bearings and magnetic concentric sockets. The primary drive axle of the electric motor connects to the sun gear of the gear train assembly so that each of the planet gears rotates which in turn rotates each of the secondary axles. Slip clutches and magnetic concentric sockets are rotatably attached to the secondary axles so that the magnetic concentric sockets are rotated when the sun gear is rotated and thereby loosens or tightens a wheel's lug nuts.

There has thus far been outlined, in a general description, the central functionality of the present invention in order that the detailed description that follows may be better understood, and furthermore, that the present contribution to the art may be appreciated. Additional features and functionality of the present invention will be described and will form the subject matter of the claim appended hereto. The purpose of the present invention and its distinct features of novelty which characterize and distinguish the present invention are pointed out with particularity in the claim annexed hereto and forming part of this disclosure.

With reference to the drawings FIGS. 1 through 10 herein, shown is the new Powered Multi-Lug Nut Removal Tool embodying the principles and concepts of the present invention will be described.

Figure 1:
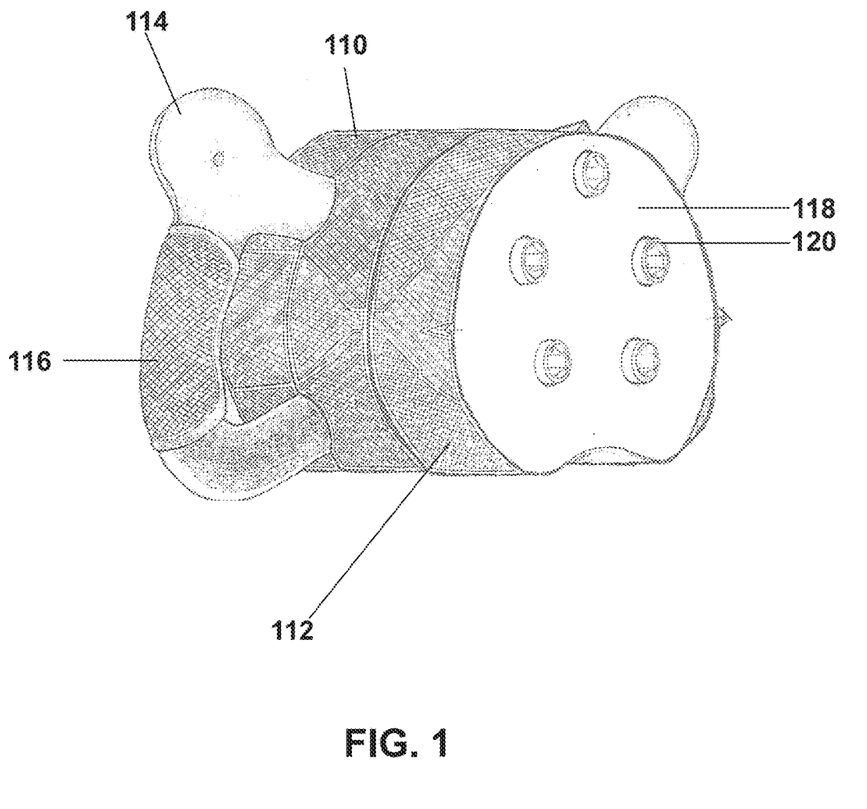
FIG. 1 is a perspective view of the front of the powered multi-lug removal tool in full assembly according to the present invention.

FIG. 1 shows an outer view of the full assembly of the powered multi-lug removal tool in accordance with the present invention. The multi-lug nut tool 100 comprises two main components: the motor housing 110 and a detachable motorized gear drive 112 also referred to as the unitary housing. The motor housing has sponge handles 114 extending outward from the housing. These handles further comprise rubber grips 116. The motor housing also contains the motor assembly. The unitary housing 112 contains the gear assembly. The front face 118 can be changed to accommodate various lug nut patterns and various numbers of lug nuts in the patterns. Drive connectors 120 will engage lug nuts on the wheels for removal and installation.

Figure 2:
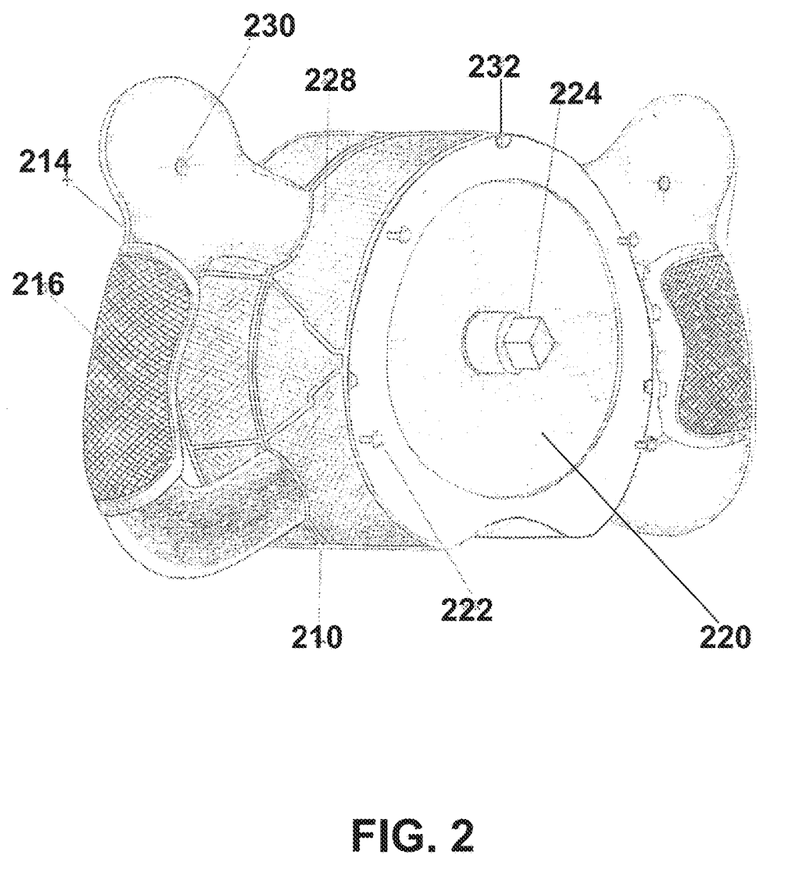
FIG. 2 is a perspective view of the motor housing with the primary drive shaft.

FIG. 2 is a perspective view of the motor housing with the primary drive shaft. This motor housing 210 contains an electric motor that will power the device. The primary drive axle 224 extends outward from the front surface 220 of the motor housing. The electric motor housing has reflectors 228, and handles 214 with rubber grips 216 and LED lights 230 embedded in the front facing upper quadrant of each handle 214. The front surface 220 of the electric motor unitary housing contains electrical contacts 232 located at the top left and right center of the axis 224 of the front surface of the electric motor unitary housing 212. Male studs 222 provide a secure connection of the motor housing 210 to the gear train assembly unitary housing 312.

Figure 3:
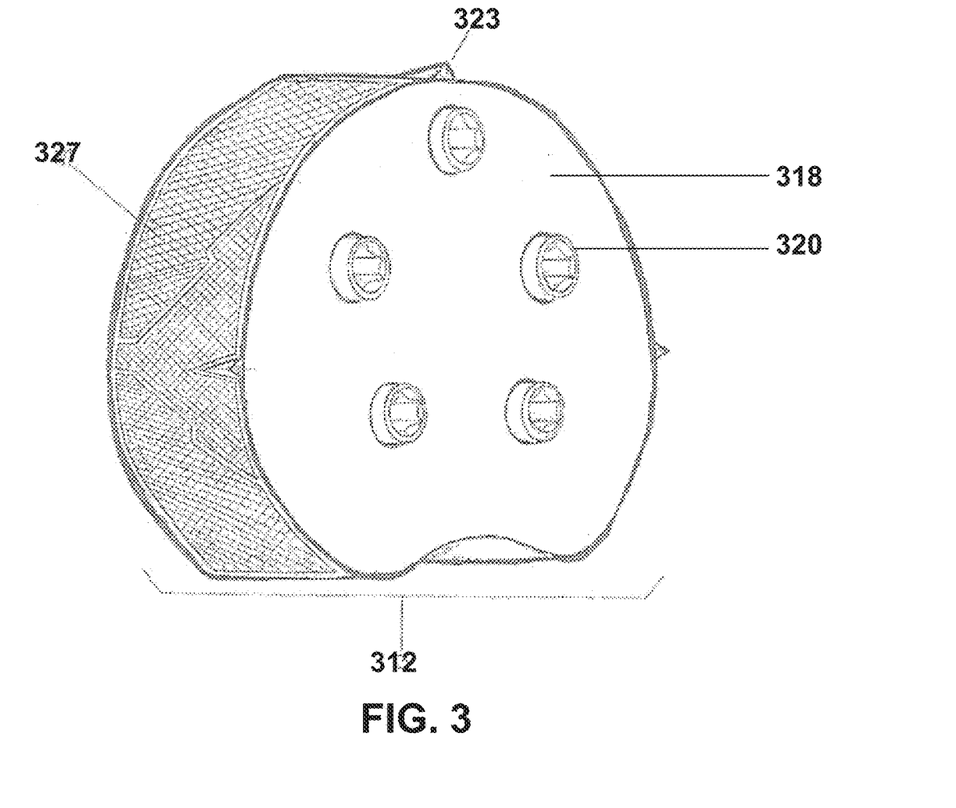
FIG. 3 is a perspective view of the gear train assembly in the attachable/detachable unitary housing of the present invention.

FIG. 3 is a view of the front outer surface gear train assembly in the attachable/detachable unitary housing 312 of the present invention. The front surface 318 of the gear train assembly housing 312 contains three (3) embedded LED lights 323, each located at strategic positions on the top, left, and right center of the axis of the front surface 318. The outer surface of the gear train assembly housing contains reflectors 328.

Figure 4:
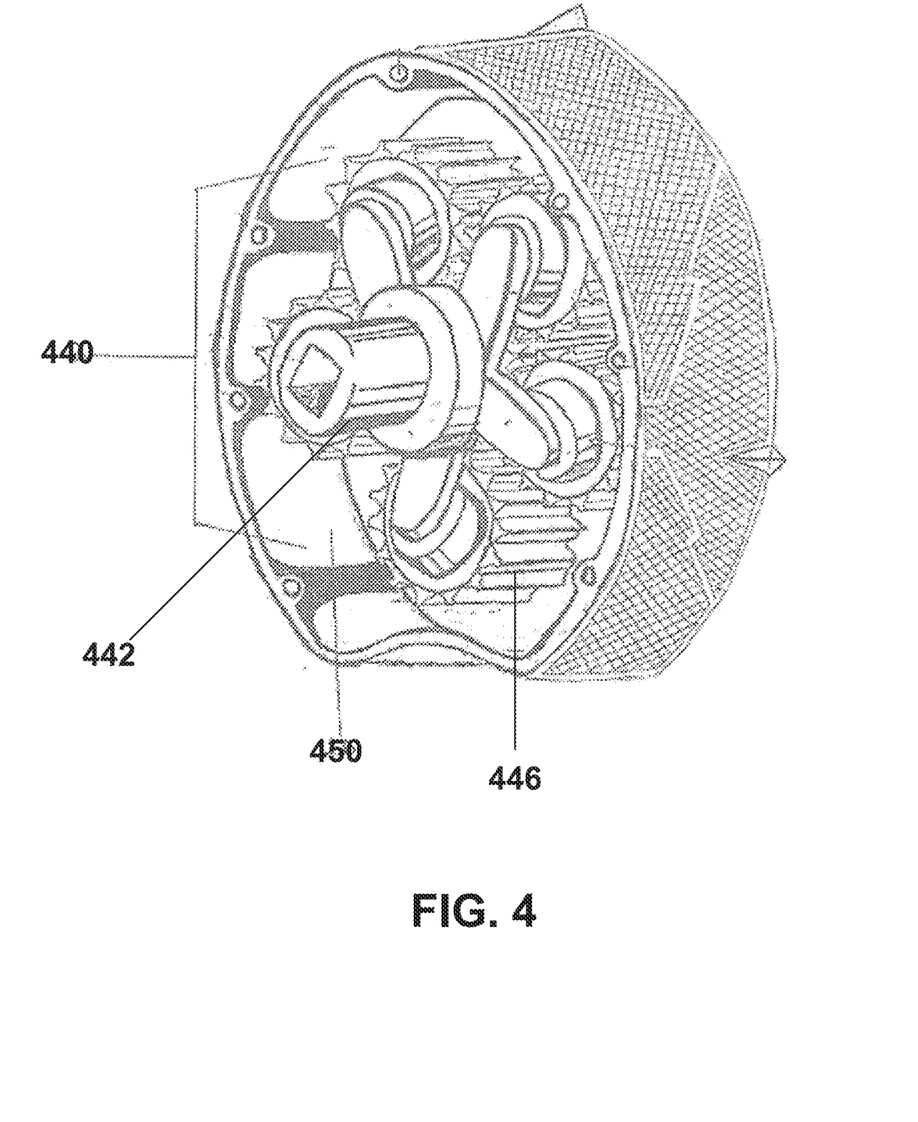
FIG. 4 is an internal rear view of the gear train assembly of the present invention.

FIG. 4 is an internal rear view of the gear train assembly in the attachable/detachable unitary housing 312 of the present invention. The gear train assembly 440 contains a sun gear which is connected to the primary drive 442 which will rotate the sun gear and the sun gear rotation will in turn rotate a plurality of planetary gears 446 that are rotatably attached to the gear train assembly unitary housing 450.

Figure 5:
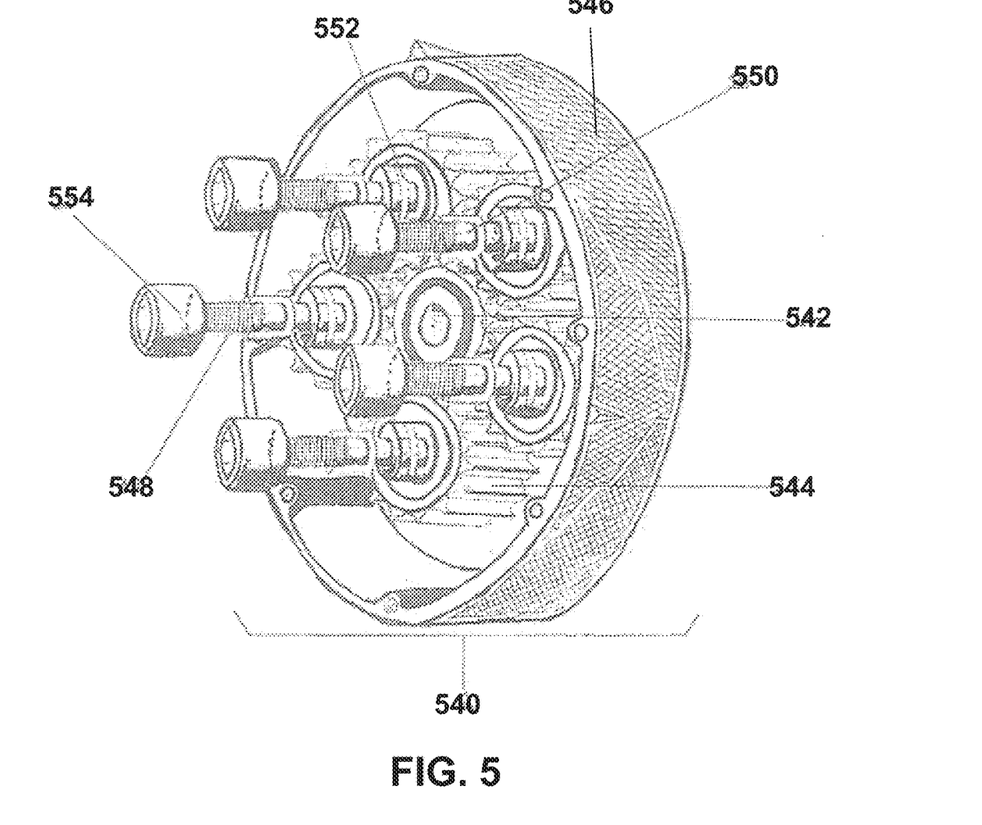
FIG. 5 is an internal view of the gear train assembly components with magnetic concentric sockets.

FIG. 5 is an internal view of the gear train assembly components with magnetic concentric sockets. The gear train assembly 540 contains a sun gear 542 and a plurality of planetary gears 544 that are rotatably attached to the gear train assembly unitary housing 546. Each of a plurality of planet gears 544 have secondary axles 548 and corresponding bearings 550, slip clutches 552, and magnetic concentric sockets 554.

Figure 6:
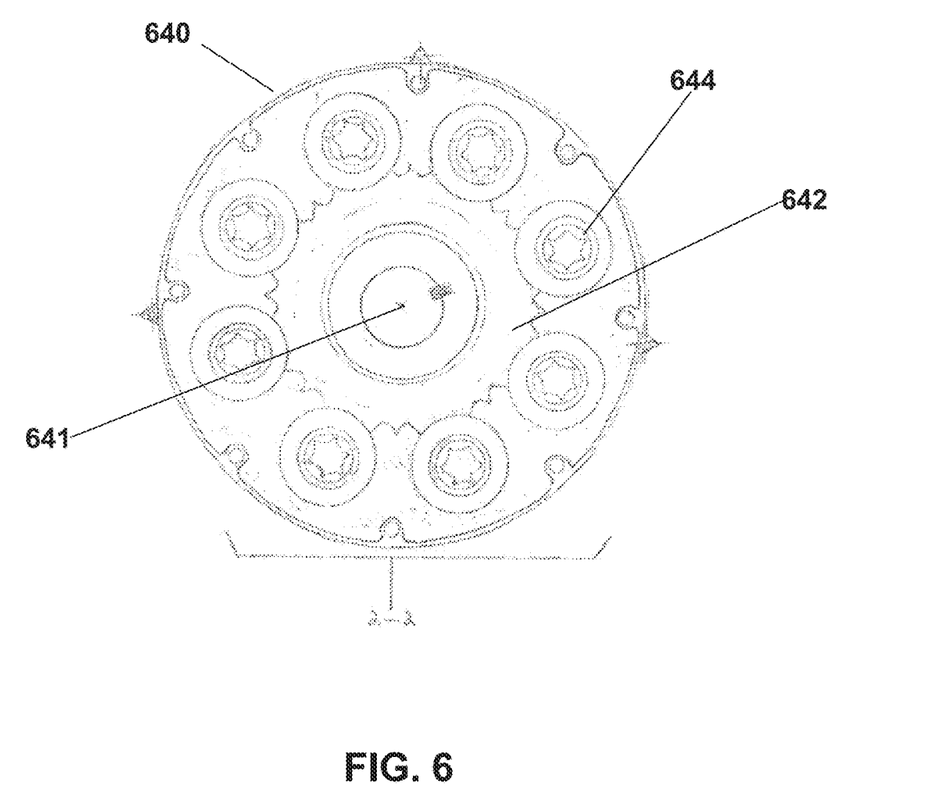
FIG. 6 is a cross-sectional view taken along lines 2-2 of FIG. 5 of the present invention.

FIG. 6 is a cross-sectional view of the gear train assembly 640 of FIG. 5 of the present invention. As shown, a sun gear 642 is positioned around a primary axle 641 and between a plurality of planet gears 644. As the primary axle rotates the sun gear, this rotation causes the rotation of the plurality of planet gears which will loosen or tighten lug nuts.

Figure 7:
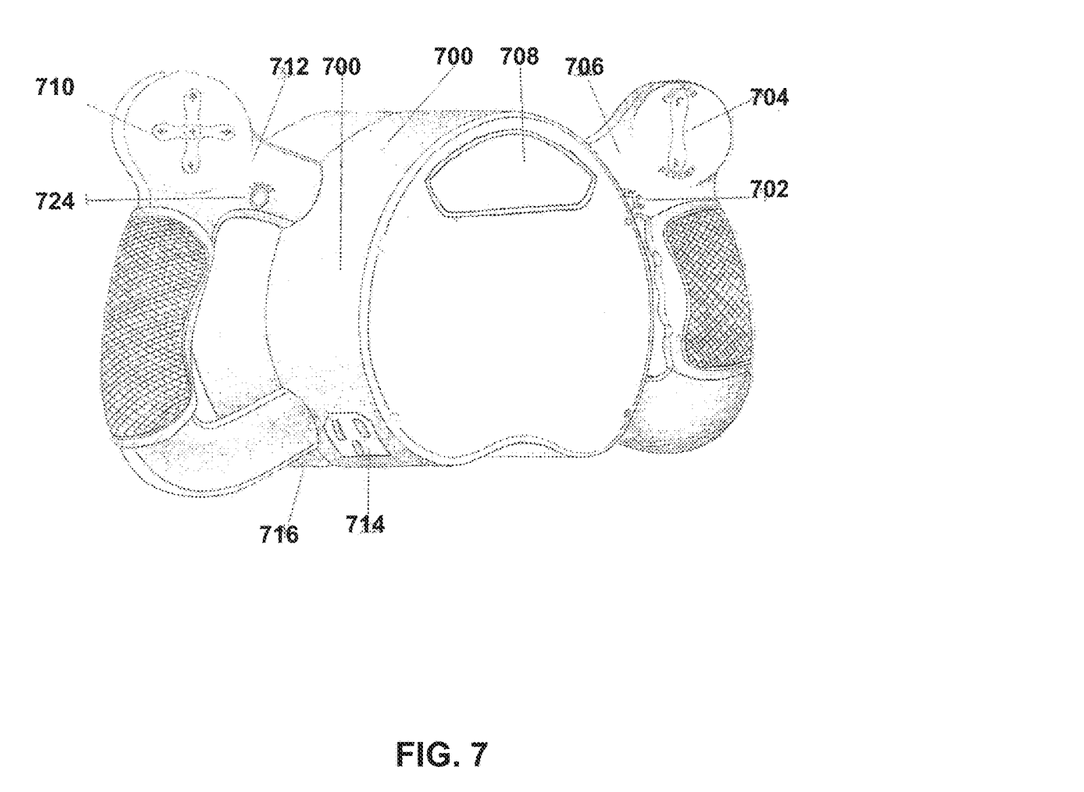
FIG. 7 is a perspective view of the rear of the powered multi-lug removal tool according to the present invention.

FIG. 7 is a perspective view of the rear of the powered multi-lug removal tool 700 according to the present invention. A power switch 702 and a direction control switch 704 are inserted in the rear facing upper quadrant of the right handle 706. The power switch closes a circuit between the power source and the electric motor. The direction control switch determines the clockwise or counter-clockwise rotation of the lug nuts. A menu control switch 710 is located in the rear facing upper quadrant of the left handle 712. An LCD display 708 can be located in the upper third of the rear surface of the electric motor unitary housing. The LCD display presents the on/off status of the electric motor and the tightening and loosening status of each lug nut. An AC/DC power inlet 714 is located in the side body adjacent to the lower portion of the left handle 716. The AC/DC power inlet provides an access point for electric power sources. The LED lights 323 of the gear train assembly unitary housing are connected to illuminate the work area when the LED lights button is depressed 724.

Figure 8:
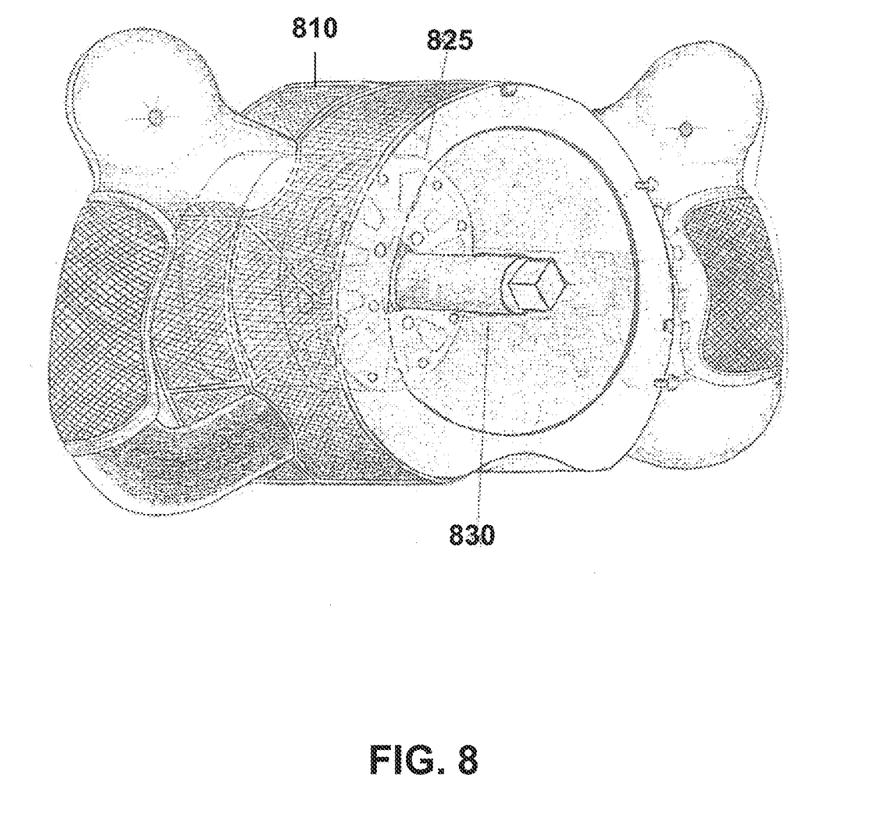
FIG. 8 is a perspective view of an electric motor of the multi-lug removal tool according to the present invention.

FIG. 8 is a view of an electric motor of the multi-lug removal tool according to the present invention. The motor housing 810 contains the electric motor 825. Attached to the electric motor is the primary drive axle 830.

Figure 9:
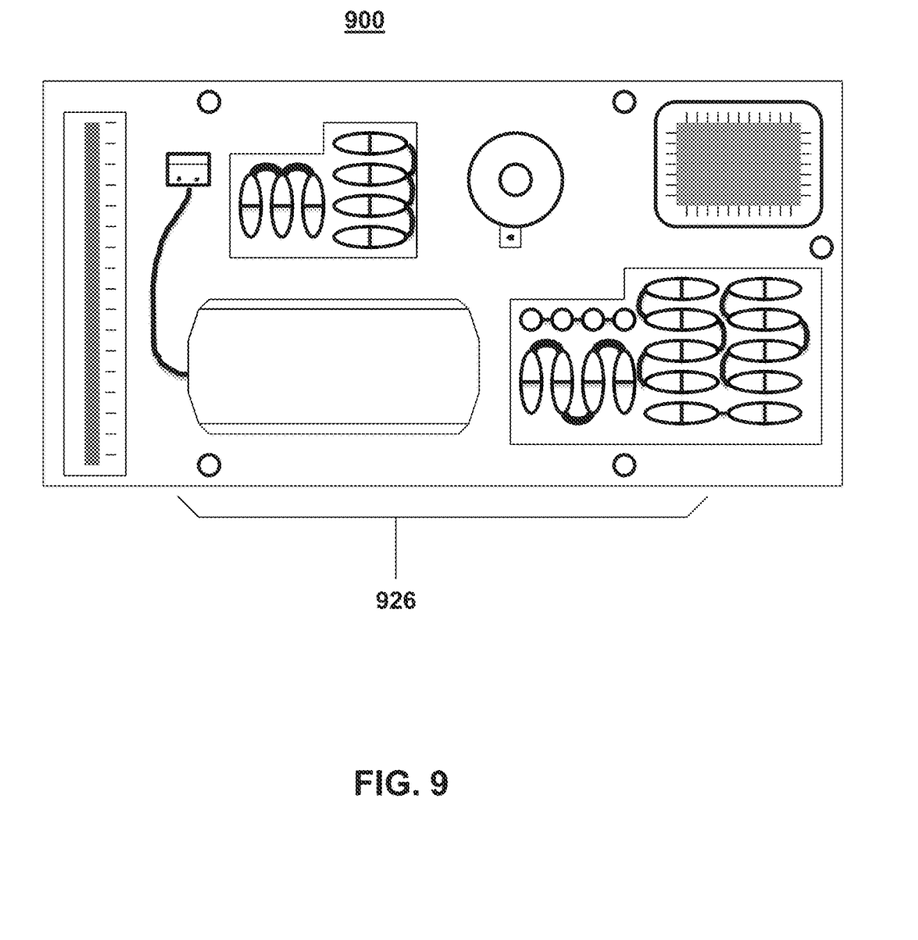
FIG. 9 is a perspective view of a computer circuit board used in the multi-lug removal tool according to the present invention.

FIG. 9 is a perspective view of a computer circuit board 900 used in the multi-lug removal tool according to the present invention. The tightening and loosening of each lug nut is displayed on the LCD display that is physically connected to the computer circuit board 926 that can algorithmically compute the tightening and loosening status based on the lug nuts' thread count, amount of power to rotate the lug nut and the estimated time to tighten or loosen the lug nut compared to the actual elapsed time.

Figure 10:
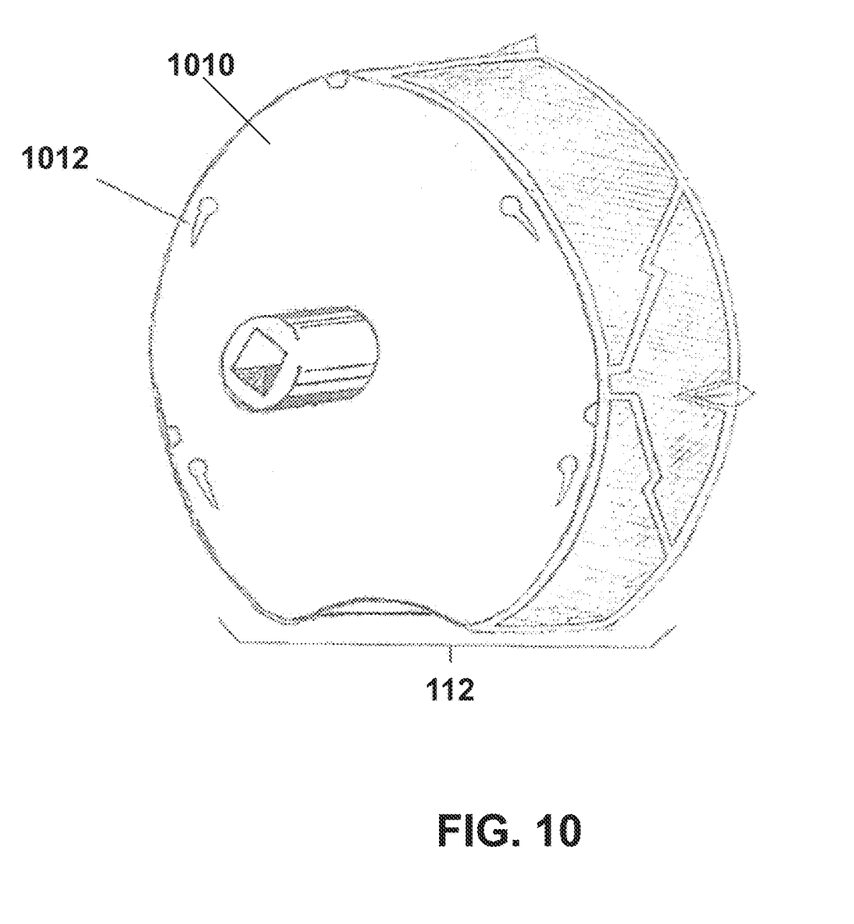
FIG. 10 is a perspective view of the rear of the gear train assembly unitary housing according to the present invention.

FIG. 10 is a perspective view of the rear of the gear train assembly unitary housing according to the present invention. The rear surface 1010 of the gear train assembly unitary housing 112 contains female slip locks, 1012 that connect to the male studs of the electric motor unitary housing 222 to securely connect the housings to form a single functioning unit.

Figure 11:
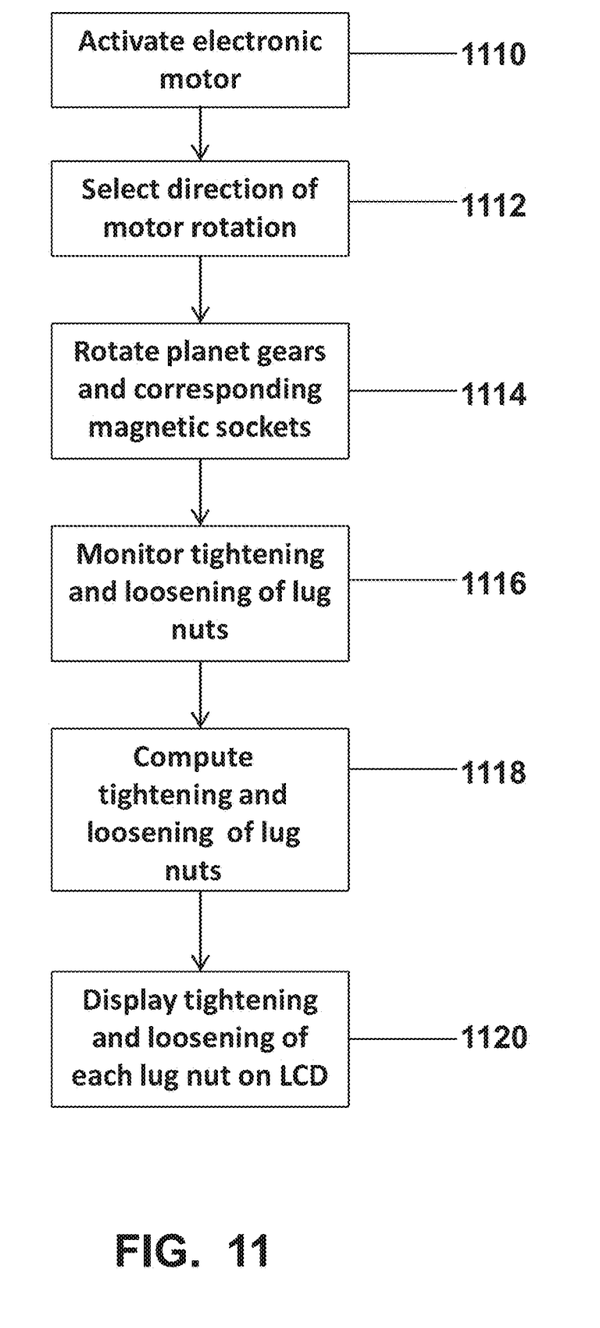
FIG. 11 is a flow diagram of the general method in the implementation of the present invention.

FIG. 11 shows the steps in the general method in the implementation of the present invention. In use, the initial step 1110 activates the electric motor 825 by the power switch 702. Step 1112 selects the direction of rotation by depressing the direction control switch 710. In step 1114, the electric motor rotates the primary drive axle 830 which in turn rotates the sun gear 542 which distributes the rotational force to each of a plurality of planet gears 544. As each planet gear is rotating, each of the corresponding secondary axles 548 and magnetic concentric sockets are rotated thereby tightening or loosening a wheel's lug nut. Through a series of sensors, step 1116 monitors the tightening or loosening of the lug nuts. Step 1118 uses information gathered from the sensors to algorithmically compute the tightening and loosening status of each lug nut based on the lug nuts' thread count, amount of power to rotate the lug nut and the estimated time to tighten or loosen the lug nut compared to the actual elapsed time. Magnetic concentric sockets 554 are used so that a plurality of lug nuts may be received and held within the socket. Slip clutches 552 and bearings 550 are employed to ensure continuous rotational force should a single lug nut be fully tightened in advance of other lug nuts. Step 1120 displays the status of each lug nut on a set of LCD's connected to the circuit board of FIG. 9.

Figure 12:
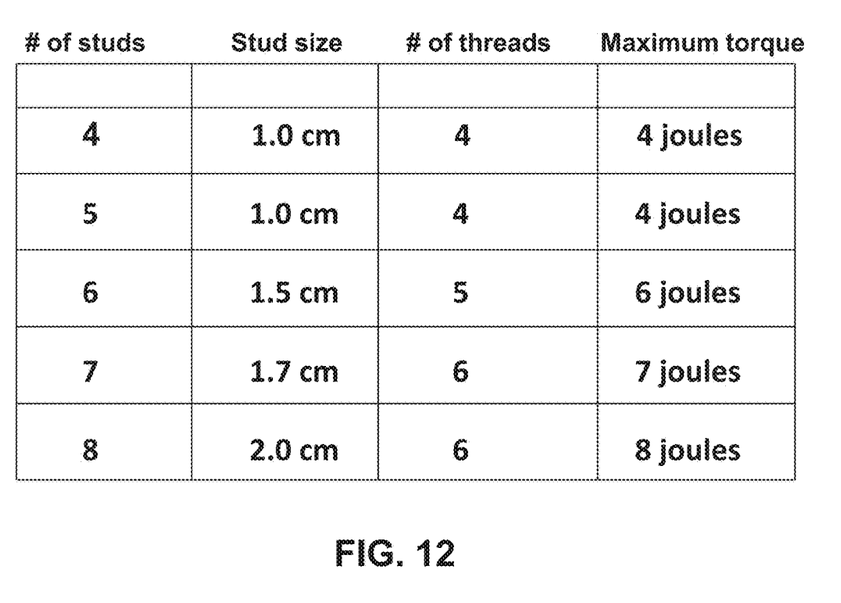
FIG. 12 is a chart of lug nut parameters for monitoring the removal and installation of lug nuts.

FIG. 12 is a chart of lug nut parameters for monitoring the removal and installation of lug nuts. In the implementation of the present invention, there will be a set of parameters that will be used to monitor and control the removal or installation of lug nuts. Before the actual process of removing or installing lug nuts begins, the user will input the parameters for the particular lug nuts involved. These parameters will govern the process. FIG. 12 is an example of a set of parameters one can use. In this chart, there is a column indicating various wheel stud patterns based on the number of studs used on a wheel. In addition to the number of studs per wheel, the stud size is listed. The number of threads per a stud is connected to the stud size. This chart also lists a maximum torque for each stud. The torque can also be a function of the stud size. Once the installation process reaches the maximum torque for a stud, that stud will be considered sufficiently tightened. A database located in the memory on the circuit board stores these parameters. With regards to FIG. 12, these parameters are just examples of parameters that can be used. In addition to these listed parameters can be others parameters such as estimated elapsed time and required power. As mentioned, this method of this invention used the stored parameters along with real time data gathered from sensors to control stud removal and installation.

Figure 13:
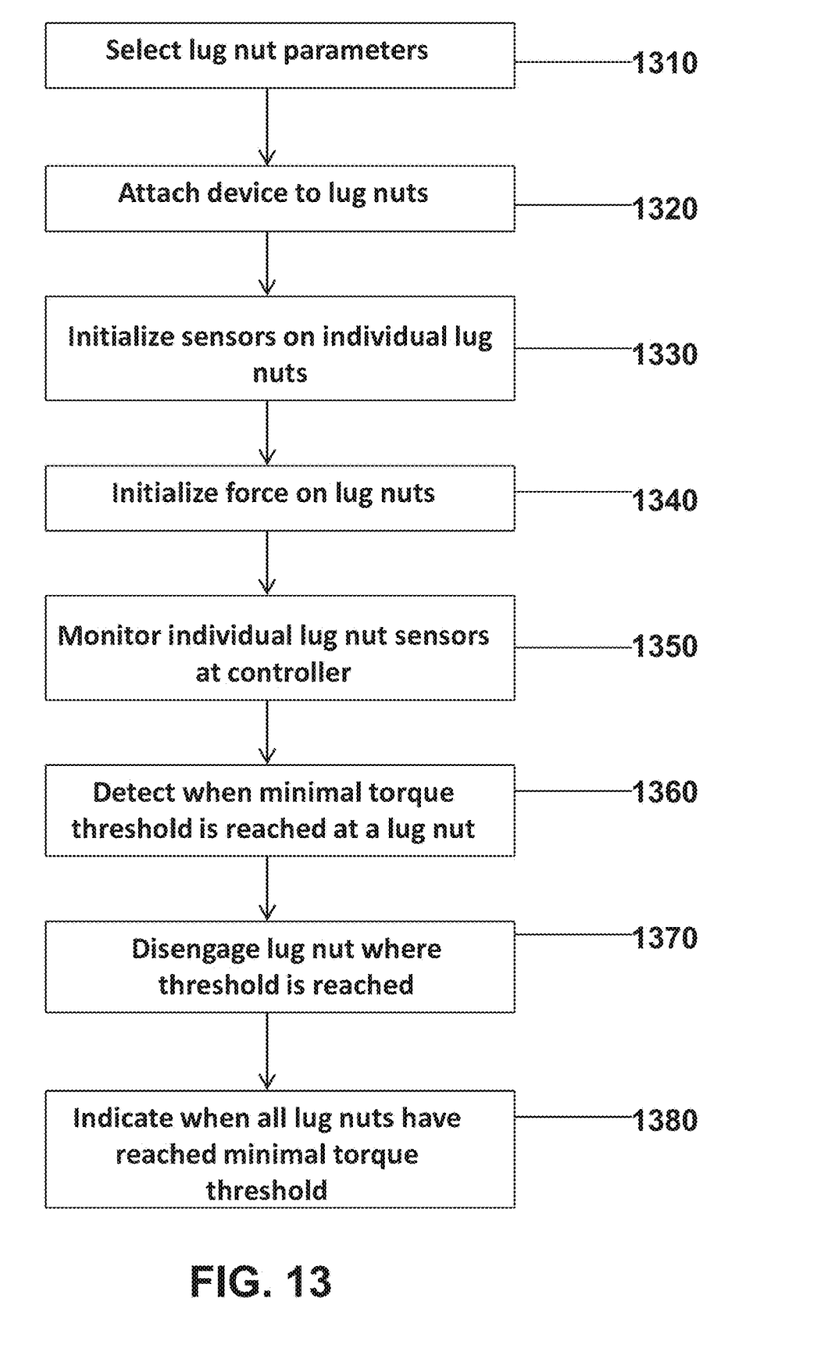
FIG. 13 is a flow diagram of the steps in the simultaneous removal of multiple lug nuts in accordance with the present invention.

FIG. 13 is a flow diagram of the steps in the simultaneous removal of multiple lug nuts in accordance with the present invention. In this method, in step 1310 parameters for the particular lug nuts are selected. In step 1320, the multi-lug nut removal device is attached to the vehicle wheel. Step 1330 initializes sensors on individual lug nuts. At this point, step 1340 force is applied on lug nuts. The intent to remove or install lug nuts will determine the rotation and direction of the force. Sensors detect information at individual lug nuts. Step 1350 monitors information from individual lug nuts at a controller. As part of this monitoring process, certain detected parameters are compared to previously established parameter threshold values. In this method, step 1360 detects when a minimal torque is reached at each lug nut. When there is a detection of a minimal threshold being reached at a lug nut, step 1370 disengages the machine at that lug nut. Step 1380 indicates when all lug nuts have reached the minimum torque threshold. Step 1380 can also indicate other activities during this process such as the time elapsed.

Figure 14:
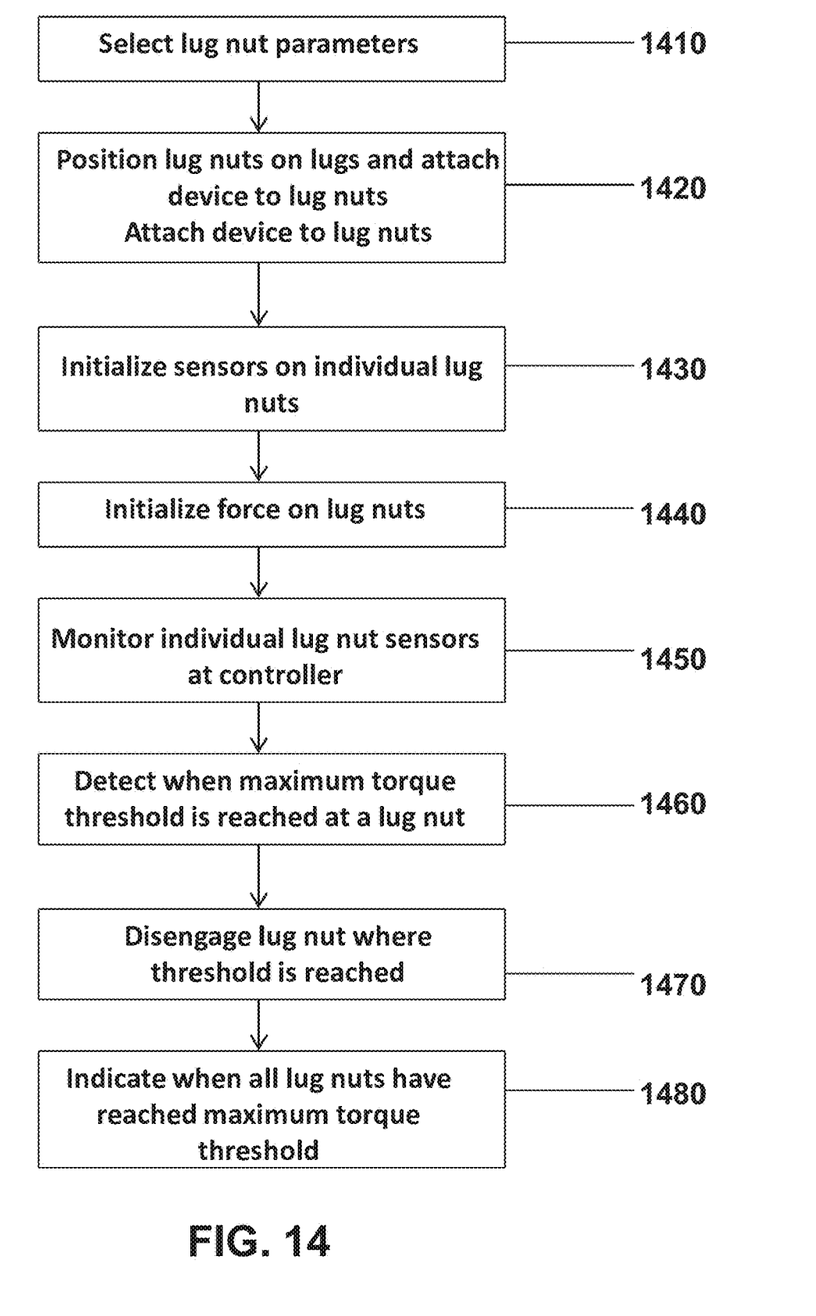
FIG. 14 is a flow diagram of the steps in the simultaneous installation of multiple lug nuts in accordance with the present invention.

FIG. 14 is a flow diagram of the steps in the simultaneous installation of multiple lug nuts in accordance with the present invention. In this method, in step 1410 parameters for the particular lug nuts are selected. Also, the torque threshold for the particular lug nuts is established. In step 1420, lug nuts are attached to the multi-lug nut installation device. This device is then attached to the vehicle wheel. Step 1430 initializes sensors on individual lug nuts. At this point, step 1440 force is applied on lug nuts. Force is applied to the lug nuts to tighten them onto the wheel. Sensors detect information at individual lug nuts. Step 1450 monitors information from individual lug nuts at a controller. In this method, step 1460 detects when the torque threshold is reached at each lug nut. When there is a detection of a maximum torque threshold is reached at a lug nut, step 1470 disengages the machine at that lug nut. Step 1480 indicates when all lug nuts have reached the maximum torque threshold.

With respect to the above description, it is to be realized that the optimum dimensional relationship for the parts of the invention, to include variations in size, materials, shape, form, function and manner of operation, assembly and use, are deemed readily apparent and obvious to anyone skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Although the device described herein is innovative in design and application, it does inherently require the use of several component parts that have heretofore been patented. This patent application is not to be construed as an attempt by those submitting this application to in any way usurp nor supersede said rights of any component parts—be they specifically mentioned or not. The applicants herein do fully acknowledge the existence of said pre-existing right as appropriate and make no claim thereon.

The applicants herein have submitted this patent application regarding the total device, in the aggregate, as described herein, as unique and without peer, deserving of patent protection.

I hereby claim the following:

1. A multi-lug nut replacement device that simultaneously loosens a plurality of lug nuts from a vehicle's wheel; said device removes and tightens lug nuts in varying wheel lug patterns and various vehicular wheel depths comprising:
   an electric motor unitary housing constructed of a lightweight, durable material and containing an electric motor with a primary axle that provides rotational force to a detachable gear train assembly;
   a detachable gear train assembly comprising;
      a sun gear rotatably attached to a plurality of planet gears of said gear train assembly which are rotated when the sun gear is rotated;
      a plurality of slip clutches, and bearings, each corresponding to a secondary axle, to ensure that all lugs are completely loosened; and
      magnetic concentric sockets are used to secure and capture each lug nut when in use; and
   a computer board containing an algorithm to calculate tightening and loosening status and physically connects to an LCD screen to display the loosening status.

2. The multi-lug nut replacement device of claim 1, wherein said electric motor unitary housing contains two handles, each with a rubber grip and located on each side of the housing body, LED lights, electrical contacts, female slip locks, a power switch, a direction control switch, an LCD display, reflectors, and an AC/DC power inlet, and a computer board.

3. The multi-lug nut replacement device of claim 1 further comprising a gear train assembly unitary housing for housing said detachable gear train assembly, said gear train assembly unitary housing comprising:
   a modular unit constructed of a lightweight durable material and having a series of outlets in its cover of sufficient number to correspond with various vehicular wheel patterns, and each outlet having sufficient diameter to allow a secondary axle to protrude through its cover, said housing width and depth being constructed to accommodate a rotatably attached sun gear and a series of planet gears that correspond with a vehicular wheel pattern, and rotatably connect to corresponding secondary axles; said housing having male studs, LED lights, and reflectors.

4. The multi-lug nut replacement device of claim 1, wherein said detachable gear train assembly comprises a sun gear and a plurality of planet gears meshed with the sun gear by a series of teeth cut across the edge of and parallel to each gear's axis; each planet gear having a secondary axle with a slip clutch and bearing and an attachable/detachable magnetic concentric socket.

5. The multi-lug nut replacement device of claim 1 wherein said magnetic concentric sockets receive and capture lug nuts as said magnetic concentric sockets are removed from the vehicle's wheel and grip lug nuts while said magnetic concentric sockets are being tightened.

6. The multi-lug nut replacement device of claim 1, wherein a computer circuit board contains an algorithm, an operating system, and a database that is used to determine the tightening and loosening status of the multi-lug removal device.

7. The multi-lug nut replacement device of claim 2, wherein the LED lights are used to illuminate the work surface area.

8. The multi-lug nut replacement of claim 2, wherein the electrical contacts transfer electrical power from the power source to the LED lights in the gear train assembly unitary housing.

9. The multi-lug nut replacement device of claim 2, wherein the female slip locks connect with the male studs of the gear train assembly unitary housing to form a single functioning unit.

10. A multi-lug nut replacement device that simultaneously tightens a plurality of lug nuts from a vehicle's wheel; said device removes and tightens lug nuts in varying wheel lug patterns and various vehicular wheel depths comprising:
   an electric motor unitary housing constructed of a lightweight, durable material and containing an electric motor with a primary axle that provides rotational force to a detachable gear train assembly;
   a detachable gear train assembly comprising;
      a sun gear rotatably attached to a plurality of planet gears of said gear train assembly which are rotated when the sun gear is rotated;
      a plurality of slip clutches, and bearings, each corresponding to a secondary axle, to ensure that all lugs are completely tightened; and
      magnetic concentric sockets are used to secure and capture each lug nut when in use; and
   a computer board containing an algorithm to calculate tightening and loosening status and physically connects to an LCD screen to display the tightening status.

11. The multi-lug nut replacement device of claim 10 wherein a computer circuit board contains an algorithm, an operating system, and a database that is used to determine the tightening status of the multi-lug removal device.

12. The multi-lug nut replacement device of claim 10 wherein said electric motor unitary housing contains two handles, each with a rubber grip and located on each side of the housing body, LED lights, electrical contacts, female slip locks, a power switch, a direction control switch, an LCD display, reflectors, and an AC/DC power inlet, and a computer board.

13. A method for simultaneously removing a plurality of lug nuts of various wheel patterns and varying wheel depths comprising:
   activating an electric motor being positioned to connect to and provide rotational force to a series of gear train assemblies, wherein a sun gear distributes a rotational force to a plurality of planet gears positioned around the circumference of the sun gear and are rotatably attached to a series of secondary axles that when rotated, tighten or loosen a lug nut;
   selecting a direction for rotation of a primary axle connected to the electric motor;
   rotating a plurality of planet gears in the selected direction of the rotation of the primary axle;
   monitoring a lug nut and computing parameters connected to tightening or loosening the lug nut;
   displaying a status for the lug nut based on the computed parameters.

14. The method for simultaneously removing a plurality of lug nuts of various wheel patterns and varying wheel depths as described in claim 13 further comprising before said motor activation, inserting a primary drive axle and male studs of the electric motor and unitary housing into female slip locks and a sun gear of a gear train assembly unitary housing and turning the gear train assembly unitary housing in a clockwise direction to securely connect both housings.

15. The method for simultaneously removing a plurality of lug nuts of various wheel patterns and varying wheel depths as described in claim 13 further comprising connecting electrical contacts on a front face of an electric motor unitary housing with the electrical contacts of the LED lights on the rear face of the gear train assembly unitary housing.

16. The method for simultaneously removing a plurality of lug nuts of various wheel patterns and varying wheel depths as described in claim 13 further comprising connecting the electric motor to the computer circuit board in the electric motor unitary housing, and algorithmically calculating the time remaining to completely tighten or loosen each lug nut.

17. The method for simultaneously removing a plurality of lug nuts of various wheel patterns and varying wheel depths as described in claim 13 wherein the computer circuit board contains a central processing unit, a clock, communications parts, upper memory, random access memory, a power module, an operating system, a basic input/output system, an algorithm and an SQL Lite database.

18. The method for simultaneously removing a plurality of lug nuts of various wheel patterns and varying wheel depths as described in claim 13 wherein the algorithm calculates the time remaining to tighten or loosen each lug nut by storing: the RPM of the electric motor in random access memory, the known thread counts of vehicular wheel studs in a SQL Lite database, calculating the threads consumed on a wheel's stud, the amount of elapsed time to consume the threads, the threads remaining to be consumed and the remaining amount of time remaining to completion.

* * * * *